United States Patent [19]

Reinertz

[11] Patent Number: 4,615,100

[45] Date of Patent: Oct. 7, 1986

[54] CRIMPING PROCESS AND CRIMPING APPARATUS FOR CARRYING OUT THE PROCESS

[75] Inventor: Rudolf Reinertz, Wuppertal, Fed. Rep. of Germany

[73] Assignee: Grote & Hartmann GmbH & Co., Wuppertal, Fed. Rep. of Germany

[21] Appl. No.: 603,934

[22] Filed: Apr. 26, 1984

[30] Foreign Application Priority Data

Apr. 27, 1983 [DE] Fed. Rep. of Germany ....... 3315227

[51] Int. Cl.[4] .............................................. B23P 23/00

[52] U.S. Cl. .................................. 29/564.8; 29/564.4; 29/33 M

[58] Field of Search ................. 29/33 M, 33 F, 564.2, 29/564.4, 564.8

[56] References Cited

U.S. PATENT DOCUMENTS

| | | | |
|---|---|---|---|
| 2,954,599 | 10/1960 | Cootes | 29/33 |
| 4,175,316 | 11/1979 | Gudmestad | 29/564.4 X |
| 4,367,575 | 1/1983 | Forster et al. | 29/33 M |

*Primary Examiner*—E. R. Kazenske
*Assistant Examiner*—Willmon Fridie, Jr.
*Attorney, Agent, or Firm*—Larson and Taylor

[57] ABSTRACT

An improvement is provided in a crimping process of the type wherein linear sections of a specified length are cut off from a roll of insulated wire and the opposite ends are insulation-stripped and crimped, and wherein the insulated wire is periodically advanced along a path of travel by a distance corresponding to the length of the wire sections. The stripped ends of the insulated wire and wire section are rotated from the path of travel and inserted in a crimping for crimping thereof and thereafter these ends, after crimping, are rotated back into the path of travel, with the crimped wire section then being removed from the path and the crimped insulated wire being conveyed further along the path. The invention, the provision in parallel with the insulated wire of a second insulated wire which is processed and crimped in the same way as the first wire for crimping. Crimping is effected using the same crimping means and assuming equal operational cycles, the following relative sequential relationships exist between the two operations: the first wire is cut to length while the second wire is rotated from its initial path; the first wire is insulation-stripped while these second wire is crimped; the first wire is rotated from its initial path while the second wire is moved back to its initial path; the first wire is crimped while the second wire is cut to length; and the first wire is moved back to its initial path while the second wire is insulation-stripped.

12 Claims, 2 Drawing Figures

CRIMPING PROCESS AND CRIMPING APPARATUS FOR CARRYING OUT THE PROCESS

FIELD OF THE INVENTION

The present invention relates to a crimping process of the kind wherein line wire sections of a specified length are cut off from a roll of insulated wire and the opposite ends thereof are stripped of insulation and crimped. The invention is also concerned with a crimping apparatus for carrying out the process.

BACKGROUND OF THE INVENTION

Processes of the type discussed above further provide for periodical advancement of the insulated wire along a path of travel by a distance corresponding to the desired length of the wire section. The stripped ends of the insulated wire and of the wire sections are diverted (rotated) from this path of travel and inserted into a crimping device for crimping thereof. Tnereafter, these ends, after crimping, are moved back into the path of travel with the crimped wire section being subsequently removed from the path and the remaining insulated wire, with one end crimped, being conveyed further along the path the measured distance for repetition of the process. This process and apparatus for carrying out the process are well known in the art and reference is made in this regard to West German Pat. No. 1,190,533. The prior art apparatus disclosed in this patent provides for cutting to length, insulation-stripping, and single-side or double-side striking of connectors in single strands or wires. Devices of this type have been developed to such an extent that wire lengths of 50 to 3000 mm can be processed and quantities of 1400 to 6000 pieces per hour can be produced. However, these quantities have been found to be unsatisfactory. Thus, numerous attempts have been made to increase the operating speeds of the prior art systems so as to carry out the work cycles more rapidly through the use of faster driving and operating components. However, these prior art techniques have disadvantages particularly with respect to the forces generated and the preliminary approaches taken to solve the problem of increasing production speeds have proved to be very expensive.

SUMMARY OF THE INVENTION

A major object of the present invention is to increase the efficiency per unit time of a process of the. type discussed above and to provide a suitable, relatively simple apparatus for carrying out this process.

Generally speaking, the present invention involves an improvement in a process of the type discussed above wherein a second insulated wire or second wire section is provided in parallel with the first insulated wire or wire section for dual processing therewith. The second wire or wire section is processed in the same way as the first wire or wire section for crimping, i.e., stripped of insulation and prepared for crimping in the same way, and moved (rotated) from the path of travel thereof for crimping and back to this path after crimping. Crimping is effected using the same crimping device as is used for crimping the first wire and the following relative sequential relationships are provided between the two operations, i.e., the operations involving the first and second wires or wire sections: the first wire is cut the length while the second wire is moved from the path of travel thereof; the first wire is insulation-stripped while the second wire is crimped; the first wire is moved from the path of travel thereof while the second wire is moved back to the path of travel thereof; the first wire is crimped while the second wire is cut to length; and the first wire is moved back to the path of travel thereof while the second wire is insulation-stripped. Preferably, the ends of the insulated wires or wire sections are conveyed during movement thereof to and from the path of travel thereof along an oblique plane to a common positioning plane. Advantageously, these ends are moved to the positioning planes by the same amount, i.e., over the same distance.

An apparatus for carrying out the process set forth above includes first and second robot arms for the first insulated wire or wire section spaced apart one after the other along the path of travel in the direction of operation and mounted so as to rotated about a vertical axis, and cutting and stripping means disposed in the space between the robot arms. Each robot arm being equipped with gripper means extending therebeneath and arranged opposite each other near the space between the arms, and the apparatus further comprises measuring rollers and feed rollers, disposed upstream of the gripping means of the first robot arm along the path of travel, for moving the first insulated wire through the gripping means of the robot arms and for measuring off a desired length of wire and an impact means positioned at one side adjacent to each of the robot arms. This apparatus is basically conventional, and the present invention involves the provision of third and fourth robot arms for the second insulated wire or wire section referred to above. Preferably, the third and fourth robot arms are identical in construction to the first and second robot arms and are advantageously located exactly beneath the first and second robot arms but with the gripper means thereof projecting upwardly. Preferably, measuring rollers and feed rollers for the third robot arm are disposed upstream of that robot arm. Further, a means for cutting off and stripping the second insulated wire is mounted in an intermediate space between the third and fourth robot arms.

In accordance with a preferred embodiment, the third and fourth robot arms execute the same movements as the first and second robot arms so that the third robot arm operates the impact means associated therewith and the fourth robot arm operates the impact means associated therewith. All of the robot arms are preferably mounted such that, during rotation thereof, the arms move into a common positioning plane, with the operating tools of the prespective impact means being located in that positioning plane and that plane lying between the first and second robot arms and between the third and fourth robot arms. The distance from the gripper means of the first and second robot arms to the positioning plane is preferably the same as that of the gripper means of the third and fourth robot arms from that plane.

Other features and advantages of the present invention will be set forth in, or apparent from, the detailed description of a preferred embodiment of the invention which follows.

DESCRIPTION OF THE PREFERRED EMBODIMENTS

Figure 1:
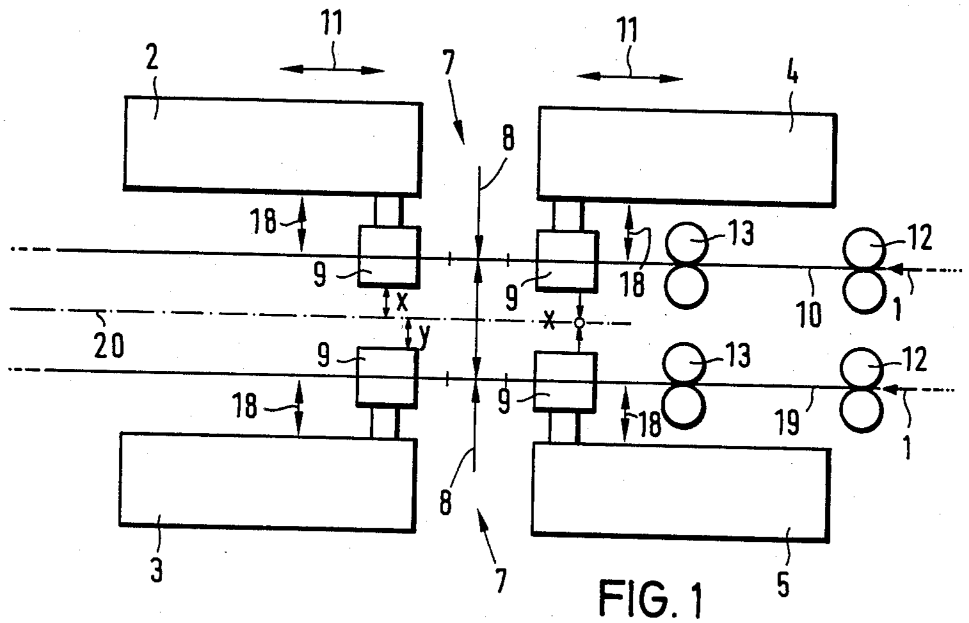
FIG. 1 is a diagrammatic side view of a crimping apparatus constructed in accordance with the present invention.
Figure 2:
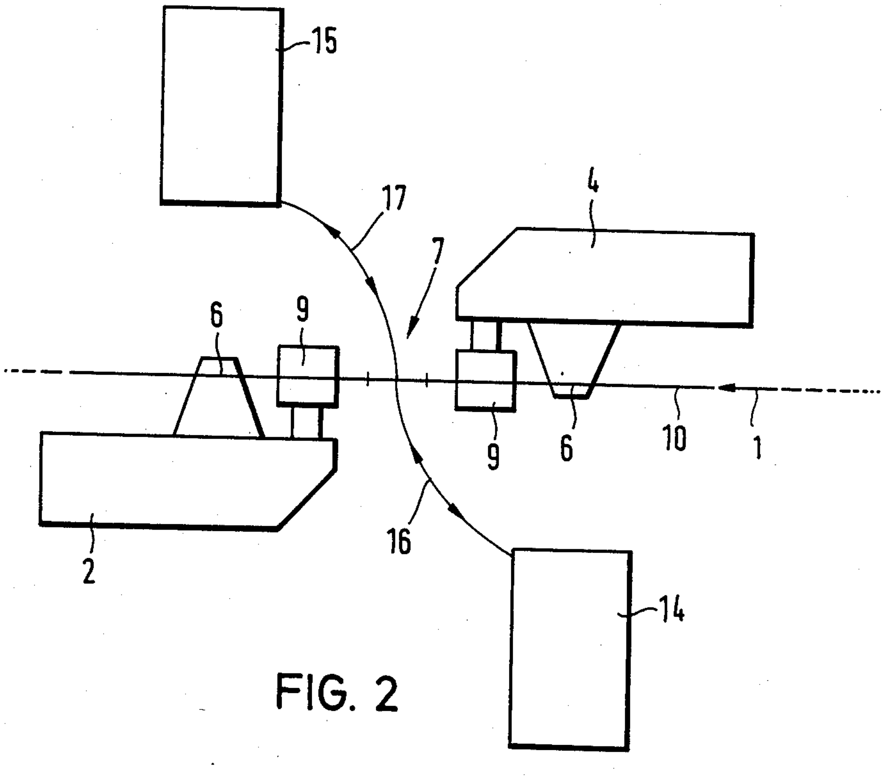
FIG. 2 is a diagrammatic top plan view of the crimping apparatus of FIG. 1.

Referring to FIGS. 1 and 2, the crimping apparatus of the invention includes four robot arms 2, 3, 4 and 5. Ignoring robot arms 3 and 5 for a moment, it is noted that, viewed in the direction of the operation of the apparatus, i.e., in the direction of arrow 1, the robot arms 4 and 2 are mounted one behind the other in a manner well known in the art so as to rotate about a vertical axis 6 on a machine frame (not shown). In the space 7 between robot arms 4 and 2 there is provided a cutting-and-stripping means 8 which is indicated schematically. Each robot arm 4 and 2 is equipped with a gripper 9, which grippers are disposed beneath the respective arms and lie opposite one another adjacent to intermediate space 7. Each gripper 9 opens and closes in order to seize an insulated wire 10, hold the wire, and thereafter release the wire. Robot arms 4 and 2 are so constructed and mounted as to be able to slide forwardly and backwardly in the direction of arrow 11. Measuring rollers 12 and feed rollers 13 are disposed upstream (in the direction opposite to arrow 1) of the gripper 9 of robot arm 4 and serve to move the insulated wire 10 through the grippers of robot arms 4 and 2 and to measure off the desired wire lengths.

The robot arms 4 and 2 each serve to operate a respective inpact device 14 and 15. As viewed in plan, these impact devices 14 and 15 are attached at the side of the corresponding robot arm 4 or 2 onto the machine frame (not shown). In other words, impact device 14 is associated with robot arm 4 and impact device 15 with robot arm 2. Robot arm 4 rotates about vertical axis 6 in the direction of the double arrow 17 and robot arm 2 rotates in th direction of double arrow 16 so that the arms, in a manner well known in the art, can convey into the working area of the associated impact device the insulated-wire end produced by the cutting-and-stripping device 8.

It is to be understood that the apparatus described above, with the exception of the provision of robot arms 3 and 5, is constructed in accordance with the prior art and operates in a conventional manner. Briefly considering this operation, insulated wire 10 is first drawn of periodically from a cable reel or roll (not shown) by means of a conventional conveyor arrangement (not shown), cut to length, and moved by measuring rollers 12 and feed rollers 13 through the grippers 9 of robot arms 4 and 2. After a wire of the desired length has obtained, the grippers 9 close and the insulated wire is cut off by cutting means 8 and the insulation stripped therefrom. During this operation, robot arms 4 and 2 slide back in the direction of arrow 7 although they can also slide forward depending upon the operation to be carried out. After the insulated wire 10 is cut and stripped, the robot arms 4 and 2 move to the corresponding impact devices 14 and 15, the stripped ends of the wire or wire sections being placed in the working tool of the corresponding impact device and the ends being crimped by the working tools of the impact devices. Thereafter, the robot arms 4 and 2 rotate back to the initial positions thereof and the grippers 9 open whereupon the insulated wire section (not shown), having been completely crimped, is removed from robot arm 2 and the insulated wire 10 which is still held by robot arm 4, is moved with the crimped end forward through the robot arm 2 until the desired length of wire is again obtained. This process is, of course, repeated until the appropriate number of wire sections have been measured, cut and crimped.

In order to place the stripped ends of the insulated wires in the crimping tools of the impact means 14 and 15 and to move the crimped wire ends therefrom, the robot arms are preferably designed to move up and down in the direction of arrow 18. However, rotation of the robot arms occurs in a horizontal plane.

Turning now to the present invention, the crimping apparatus described above is, in accordance with the invention, equipped with the two further robot arms 5 and 3 mentioned previously. These robot arms are preferably identical in construction to robot arms 4 and 2 and are advantageously located exactly beneath the robot arms 4 and 2 (see FIG. 1) but with the grippers 9 thereof directed upwardly. Further, corresponding measuring rollers 12 and feed rollers 13 associated with robot arms 5 and 3 are disposed upstream of robot arm 5. Robot arms 5 and 3 can execute the same movements described above in connection with robot arms 4 and 2 and act upon a second insulated wire 19. A corresponding cutting and stripping device 8 is similarly provided in the space between robot arms 5 and 3 for cutting off and stripping the insulated wire 19. Robot arm 5 operates impact device 14 and robot arm 3 operates impact device 15. It should be noted that in FIG. 2, the robot arms 5 and 3 and the other associated devices on the lower plane or level, are not seen because these devices are identical in construction to, and are arranged directly beneath, the corresponding devices of the upper plane including robot arms 4 and 2.

Advantageously, all four of the robot arms 4 and 2 and 5 and 3 are mounted so that, during rotation thereof, these robot arms move into an imaginary horizontal positioning plane 20. During this movement, the impact means 14 and 15 (or the working tools thereof) also lie in tne positioning 20. Accordingly, during the rotation thereof to the corresponding impact devices, the robot arms 4 and 2 move downwardly by an amount x and the robot arms 5 and 3 move upwardly by an amount y. Preferably, the amount or distance x is equal to the amount or distance y. The robot arms preferably slide along an oblique plane to the positioning plane 20 or else are equipped with an inclined or sloping drive such that raising or lowering of the robot arms by the required amount x or y is provided during the rotation of the robot arms. Preferably, the robot arms 4 and 2 are also designed to execute, during crimping and in a manner known in the art, a vertical movement in the direction of double arrow 18. Correspondingly, the robot arms 5 and 3 also move in a similar manner for the same purpose in the direction of double arrow 18.

The crimping process of the invention is intended for the periodic processing of insulated wires 10 and 19 as set forth in the comparison table below which assumes an identical cycle time:

| Sequence of Operations | |
|---|---|
| Insulated wire 10 | Insulated wire 19 |
| Cutting the wire to length | Moving of the wire from path of travel |
| Insulation-stripping of the wire | Crimping |
| Moving of wire from path of travel | Moving of the wire back to path of travel |
| Crimping | Cutting the wire to length |

-continued

| Sequence of Operations | |
|---|---|
| Insulated wire 10 | Insulated wire 19 |
| Moving tne wire back to path of travel | Insulation-stripping of the wire |

It will be appreciated from the foregoing that simply by doubling the number of robot arms a very substantial increase in the speed of operation of the prior art crimping apparatus can be obtained. Further, it is not necessary to develop any new machine elements or components. The use of prior art elements, coupled with the asynchronous cycling of the steps in each operation as set forth above wherein the robot arms operate the impact devices, in pairs, one after the other, together with the selection of a common positioning plane and the arrangement of the additional elements in a second plane with adjacent grippers relative to the positioning plane, all serve to produce the very substantial increase in operating speeds that has long been sought in the prior art and is afforded by the process and apparatus of the present invention.

Although the invention has been described relative to a preferred embodiment thereof, it will be understood by those skilled in the art that variations and modifications can be effected in this exemplary embodiment without departing from the scope and spirit of the invention.

I claim:

1. A crimping apparatus for carrying out a crimping process wherein linear sections of a specified length are cut off from a roll of insulated wire and the opposite ends are insulation-stripped and crimped, wherein the insulated wire is periodically advanced along a path of travel by a distance corresponding to the length of the wire sections and wherein the stripped ends of the insulated wire and the wire section are moved aside from the path of travel and inserted in a crimping means for crimping thereof and thereafter, the ends, after crimping, are moved back into the path of travel, the crimped wire section being removed from the path and the crimped insulated wire being conveyed further along the path, parallel to the first insulated wire or to the first wire section, a second insulated wire or a second wire section is provided which is processed in the same way as the first wire or wire section for crimping and which is moved from the path of travel thereof for crimping and back thereto after crimping; whereby crimping of both wires or wire sections is effected using the same crimping means; and whereby the following sequential relationships exist between the two operations: the first wire is cut to length while the second wire is moved from the path of travel thereof; the first wire is insulation-stripped while the second wire is crimped; the first wire is moved from the path of travel thereof while the second wire is moved back to the path of travel thereof; the first wire is crimped while the second wire is cut to length; and the first wire is moved back to the path of travel thereof while the second wire is insulation-stripped, said apparatus comprising first and second robot arms spaced apart one after the other along the said path of travel of the first wire and mounted so as to rotate about a vertical axis, a cutting-and-stripping means disposed in the space between the robot arms, gripper means, associated with each of said robot arms, extending therebeneath and arranged opposite each other near the space between the robot arms, and measuring rollers and feed rollers, disposed upstream of the gripper means of the first robot arm, for moving the first insulated wire through the gripper means of the robot arms and for measuring off a desired length, said crimping means comprising a pair of impact means positioned on opposite sides of said path of travel of the first wire adjacent to each of the robot arms, and said crimping apparatus further comprising third and fourth robot arms for the second insulated wire or wire section disposed in vertically spaced relationship to said first and second robot arms and spaced one after the other along the path of travel of the second wire, and said impact means being disposed laterally of said first and second robot arms on opposite sides of the path of travel of the second wire.

2. An aparatus as set forth in claim 1, wherein the third and fourth robot arms are identical in contruction to the first and second robot arms.

3. An apparatus as set forth in claim 1, wherein the third and fourth robot arms are respectively located exactly below the first and second robot arms but with the gripper means thereof projecting upwardly.

4. An apparauts as set forth in claim 1, wherein measuring rollers and feed rollers for the second wire are disposed upstream of the third robot arm.

5. An apparatus as set forth in claim 1 wherein a means for cutting off and stripping tne second insulated wire is mounted in an intermediate space between the third and fourth robot arms.

6. An apparatus as set forth in claim 1, wherein the third and fourth robot arms execute the same movements as the first and second robot arms so that the third robot arm operates one impact means and the fourth robot arm operates another impact means.

7. An apparatus as set forth in claim 6 wherein all of said robot arms are mounted such that, during rotation thereof, the said arms move into a common positioning plane, said impact means including operating tools located in said positioning plane, and said positioning plane being disposed between the first and second robot arms and the third and fourth robot arms.

8. An apparatus as set forth in claim 7, wherein the distance from the gripper means of the first and second robot arms to the positioning plane and from the gripper means of the tnird and fourth robot arms to the common positioning plane is the same.

9. In a crimping process for sections of wire comprising periodically advancing one end of a first insulated wire drawn off from a first roll of said insulated wire along a first path of travel by a distance corresponding to the desired length of the wire sections, cutting the wire to form a section of said desired length, insulation stripping the ends of the wire section and the insulated wire, moving the stripped ends of the insulated wire and the wire section aside from the path of travel, inserting these ends in a crimping means for crimping thereof, moving these ends, after crimping, back into said path of travel, and removing the crimped wire section from the path and advancing the crimped insulated wire further along said path, said process further comprising periodically advancing a second insulated wire or a second said wire and a second wire section cut therefrom along a second path of travel, parallel to the first path of travel, by a distance corresponding to the desired length of the second wire sections, cutting the second wire to form a second wire section of the desired length, insulation stripping the ends of the second wire and second wire section, moving the stripped ends of the second wire and second wire section aside from said second path of travel, inserting these ends in the same said crimping means for crimping thereof, moving these ends, after crimping, back into said second path of travel and removing the crimped second wire section from said second path and advancing the crimped second wire further along said path, said process providing the following relative sequential relationships between processing steps for the first and second wires: cutting the first wire to length while a section of a said second wire section which has been cut to length and insulation-stripped is moved aside from the second path of travel; insulation-stripping the first wire while the second wire is crimped; moving the first wire aside from the first path of travel while the second wire is moved back to the second path of travel; crimping the first wire while a further section of the second wire is cut to length; and moving the first wire is moved back to the first path of travel while the further section of the second wire is insulation-stripped.

10. The process as set forth in claim 9, wherein the ends of the insulated wires or wire sections are conveyed during the movement thereof from and to the path of travel thereof along an oblique path into a common positioning plane.

11. The process as set forth in claim 10, wherein ends are moved to the positioning plane by the same amount.

12. A method as claimed in claim 9 wherein the lateral movement of the first and second wires relative to the respective paths of travel thereof is generally diagonal to these paths of travel.

* * * * *